Nov. 6, 1923.

F. W. ZINK

MIRROR SUPPORT

Filed March 26, 1921

1,473,273

Inventor
Fred W. Zink

By Whittemore Hulbert Whittemore
& Belknap
Attorneys

Patented Nov. 6, 1923.

1,473,273

UNITED STATES PATENT OFFICE.

FRED W. ZINK, OF DETROIT, MICHIGAN, ASSIGNOR TO KALES STAMPING COMPANY, OF DETROIT, MICHIGAN, A CORPORATION OF MICHIGAN.

MIRROR SUPPORT.

Application filed March 26, 1921. Serial No. 455,395.

*To all whom it may concern:*

Be it known that I, FRED W. ZINK, a citizen of the United States of America, residing at Detroit, in the county of Wayne and State of Michigan, have invented certain new and useful Improvements in Mirror Supports, of which the following is a specification, reference being had therein to the accompanying drawings.

The invention relates to mirrors which are particularly applicable to motor vehicles to permit the driver to obtain a view toward the rear, and has for one of its objects the provision of a simple construction of holder and supporting clamp, the parts of which may be formed of stampings. Another object is the provision of holding members for the mirror which have complementary rounded portions forming a ball for engagement by a supporting clamp to permit of universal adjustment of the mirror. A further object is the provision of a supporting clamp which covers the heads of the securing means to conceal and protect the same. Other objects of the invention reside in the novel features of construction as more fully hereinafter set forth.

Figure 1:
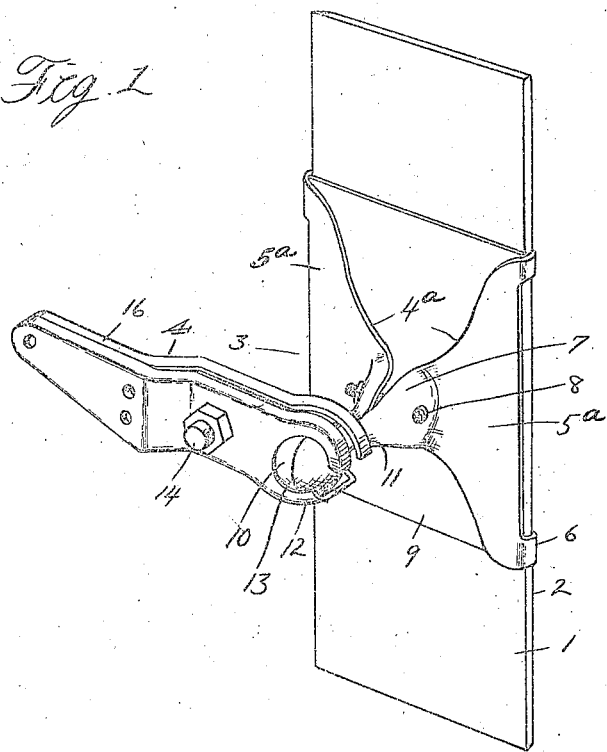
Figure 1 is a perspective view of a mirror with a holder and support embodying my invention.
Figure 2:
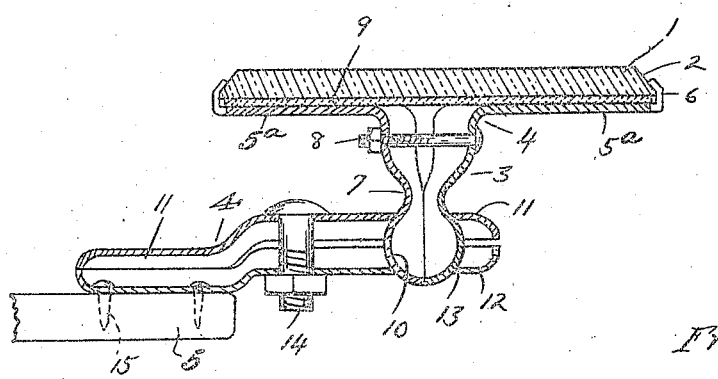
Figure 2 is a transverse cross section therethrough.

1 is the mirror preferably having the bevelled edges 2. 3 is the holder for the mirror and 4 the supporting clamp which is secured to a suitable support 5 of the motor vehicle, such as a rail.

The holder 3 comprises the identical stampings 4ª each of which has the body portion 5ª extending parallel to the back of the mirror 1, the tongues 6 extending from the outer edges of the body portion at its ends and bent over the bevelled edges 2 of the mirror, and the shank 7 extending transversely from the inner edge of the body portion 5ª. These shanks are clamped toward each other by suitable means such as the screw bolt 8, there being sufficient clearance between the adjacent edges of the shanks at their inner ends to permit of the bent-over tongues 6 firmly engaging the opposite edges of the mirror to hold the latter. To protect the mirroring material upon the back of the mirror, a suitable layer 9 of material, such as cardboard, is positioned between the back of the mirror and the body portions of the holding stampings.

For the purpose of providing universal adjustment of the mirror relative to its supporting clamp, the outer ends 10 of the shanks 7 are rounded and together form a ball, and the supporting clamp 4 comprises the plates 11 and 12 having the apertures 13 therethrough at their inner ends, the diameter of these apertures being less than the diameter of the ball, and the plates engaging on opposite sides of the ball. These plates are secured together by suitable means such as the bolt 14. The plate 12 has suitable apertures therethrough near its outer end for the passage of the headed securing means 15 and to conceal and protect the heads of these securing means, both plates 11 and 12 have the inturned flanges 16 at their edges, which flanges abut each other near their outer ends thereby inclosing the heads of the securing means.

From the above description it will be seen that I have provided a mirror holder and supporting clamp which may be formed of stampings. Also the holder comprises identical members which are clamped upon opposite edges of the mirror and have cooperating rounded portions forming a ball for adjustable engagement by the supporting clamp. Furthermore, the supporting clamp conceals and protects the headed members for securing the clamp to its support.

What I claim as my invention is:

1. The combination with a support, of a supporting clamp comprising cooperating members having flanges extending inwardly toward each other, means for securing said members to each other, means concealed by said flanges and one of said members for securing the other of said members to said support, a mirror, and means adjustably engaging said clamp for holding said mirror.

2. The combination with a support, of a supporting clamp comprising cooperating stampings having edge flanges extending inwardly toward each other, means for securing said stampings to each other, means concealed by said flanges and one of said stampings for securing the other of said stampings to said support, a mirror, and means adjustably engaging said clamp for holding said mirror.

3. The combination with a support, of a supporting clamp comprising cooperating stampings having flanges extending inwardly toward each other, means for securing said stampings to each other, means concealed by said flanges and one of said stampings for securing the other of said stampings to said support, a mirror, and cooperating members adjustably engaging said clamp for holding said mirror.

In testimony whereof I affix my signature.

FRED W. ZINK.